(12) United States Patent
Kutch et al.

(10) Patent No.: US 10,761,868 B2
(45) Date of Patent: Sep. 1, 2020

(54) DEVICE-AGNOSTIC DRIVER FOR VIRTUAL MACHINES

(71) Applicant: Intel Corporation, Santa Clara, CA (US)

(72) Inventors: Patrick G Kutch, Beaverton, OR (US); Gregory V Rose, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 737 days.

(21) Appl. No.: 15/389,931

(22) Filed: Dec. 23, 2016

(65) Prior Publication Data

US 2018/0181420 A1 Jun. 28, 2018

(51) Int. Cl.
*G06F 9/455* (2018.01)
*G06F 9/4401* (2018.01)
*G06F 13/10* (2006.01)
*G06F 9/52* (2006.01)
*G06F 9/48* (2006.01)
*G06F 3/038* (2013.01)

(52) U.S. Cl.
CPC ........ *G06F 9/45558* (2013.01); *G06F 9/4411* (2013.01); *G06F 9/4881* (2013.01); *G06F 9/52* (2013.01); *G06F 13/102* (2013.01); *G06F 13/105* (2013.01); *G06F 3/038* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 2015/0220354 A1* | 8/2015 | Nair | G06F 13/28 710/301 |
| 2016/0132443 A1* | 5/2016 | Davda | G06F 13/28 710/308 |
| 2018/0113731 A1* | 4/2018 | Cheng | G06T 1/20 |

* cited by examiner

*Primary Examiner* — Qing Yuan Wu
(74) *Attorney, Agent, or Firm* — Schwegman Lundberg & Woessner, P.A.

(57) ABSTRACT

Management of access to input/output devices by a virtual machine (VM) includes executing a hypervisor, and instantiating the VM to execute under supervision of the hypervisor. The VM is to include an I/O device-agnostic (IODA) driver that is configured to interface with the I/O device via a first path according to a set of operational parameters specific to the I/O device, and to interface with the hypervisor via a second path. The IODA driver is to configure the operational parameters to comport with an operational protocol of the I/O device based on device-description information provided to the IODA driver via the second path.

25 Claims, 7 Drawing Sheets

DEVICE-AGNOSTIC DRIVER FOR VIRTUAL MACHINES

TECHNICAL FIELD

Embodiments described herein generally relate to information systems and related methodology and, more particularly, to a system architecture and operability for managing access to input/output devices by virtual machines.

BACKGROUND

In virtual computing, a hypervisor provides the virtualization of a computer system, on which a guest operating system runs. In full virtualization, a guest operating system runs unmodified on a hypervisor. However, a paravirtualization technique may be applied in which the guest operating system communicates with the hypervisor to improve performance and efficiency. Accordingly, the guest operating system may cooperate with the hypervisor to obtain better performance when running in a virtual machine.

Single-root input/output virtualization (SR-IOV) offers network function virtualization (NFV) solutions with a number of built-in security and performance benefits. In an SR-IOV architecture, a Virtual Function (VF) driver resides within the Virtual Machine (VM), and a Physical Function (PF) driver resides within the Hypervisor. Conventionally, a VF driver is specific to the underlying hardware, which presents challenges when an existing VM is to be used with a new networking hardware.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the following figures of the accompanying drawings.

DETAILED DESCRIPTION

Various aspects of the embodiments are directed to managing access to input/output (I/O) devices by virtual machines (VMs). Input/output devices include network interface devices (NIDs), I/O ports (e.g., universal serial bus (USB) controllers, peripherals (e.g., keyboard, touchscreen, mouse, game controller), video adapters, or any other device that interfaces with a peripheral component interconnect (PCI) bus or equivalent, for example. The following description of various embodiments will focus on the example case of an NID as an example I/O device, though it should be understood that the principles of the embodiments will be applicable to various other types of I/O devices. Examples of a NID include an Ethernet card, or a wireless networking device such as a radio-based network interface device conforming to one or more standards of the IEEE 802.11 family, a long-term evolution (LTE) wireless radio access networking standard promulgated by the Third-Generation Partnership Project (3GPP), or the like.

According to one aspect of the embodiments, a SR-IOV architecture is used to bypass a hypervisor's involvement in data movement by providing independent memory space, interrupts, and direct-memory access (DMA) streams for virtual machines. SR-IOV architecture allows a device to support multiple Virtual Functions (VFs). SR-IOV facilitates two function types: physical functions (PFs), and virtual functions (VFs). PFs are PCI-express (PCIe) functions that include the SR-IOV extended capability, which may be used to configure and manage the SR-IOV functionality. VFs are "lightweight" PCIe functions that include resources for facilitating data movement but have a carefully minimized set of configuration resources.

Figure 1:
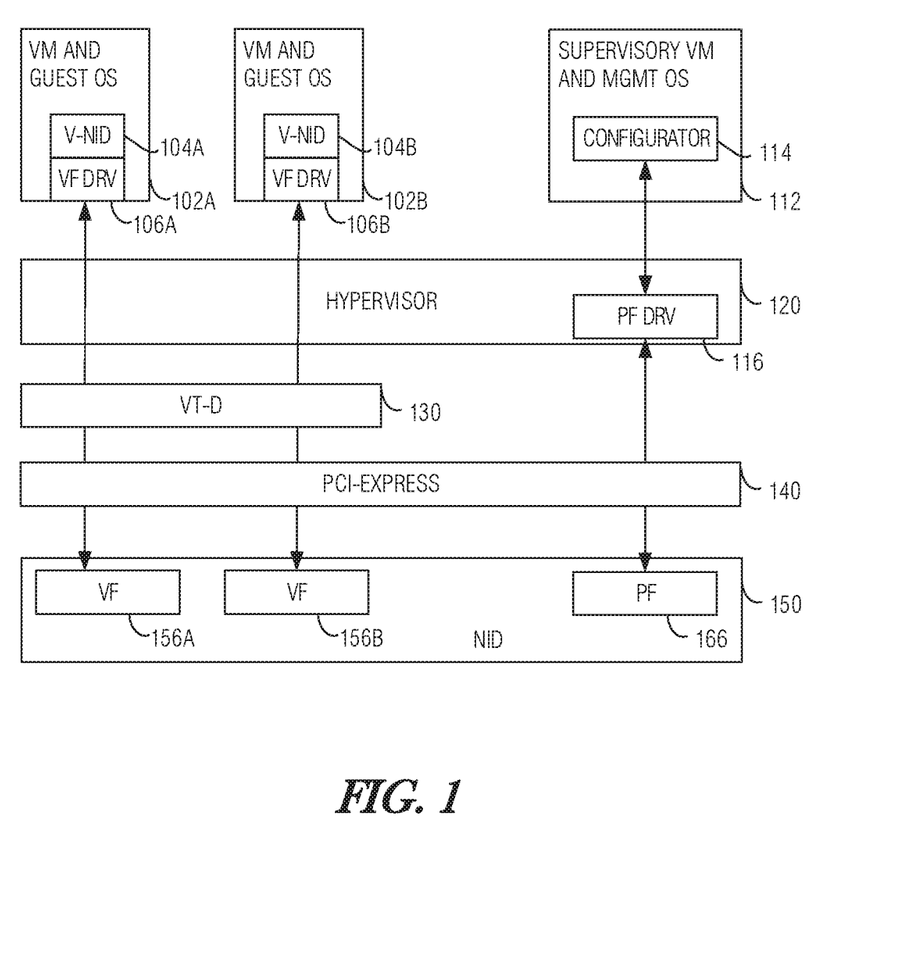
FIG. 1 is a high-level functional block diagram illustrating an example virtualization system having a SR-IOV architecture that may serve as a setting in which aspects of the embodiments may be implemented.

FIG. 1 is a high-level functional block diagram illustrating an example SR-IOV architecture that may serve as a setting in which aspects of the embodiments may be implemented. As depicted, guest operating systems (OS's) 102A and 102B are executed along-side management OS 112 in distinct virtual machines, over hypervisor 120, which in turn is executed on a computing architecture described in greater detail below with reference to FIGS. 2-3.

VMs with guest OS's 102A and 102B respectively implement virtual NIDs 104A. 104B, which utilize VF drivers 106A and 106B to operate VFs 156A and 156B facilitated by a SR-IOV-enabled NID 150. In some examples, secure data exchange is facilitated respectively between the VF drivers 106A and 106B on the VM-side, with the VFs 156A and 156B on the NID side using a PCI-express interconnect 140 and directed-I/O virtualization technology VT-d 130, with the latter providing such features as I/O device assignment, direct memory addressing (DMA) remapping, interrupt remapping, and various reliability features, such as error reporting. In other examples, isolation is provided more generally via hardware provisions such as an input/output memory management unit (IOMMU)—of which VT-d is an example. In related embodiments, the hypervisor 120 assures isolation between the VMs.

Supervisory VM and management OS 112 performs configuration of I/O controller 114, including establishing, and managing, partitioning of multiple I/O paths, and assignment (and, in some embodiments, dynamic re-assignment) of I/O paths to respective VMs. It includes engine 114, which is configured to interact with physical functions PF 166 of NID 150 via PF driver 116 of hypervisor 120 and PCI-e interconnect 140.

The example embodiments described herein may include, or may operate on, logic or a number of components, engines, or engines, which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as an engine. In an example, the whole or part of one or more computer systems (e.g., a standalone, client or server computer system) or one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular engine at one instance of time and to constitute a different engine at a different instance of time.

Figure 2:
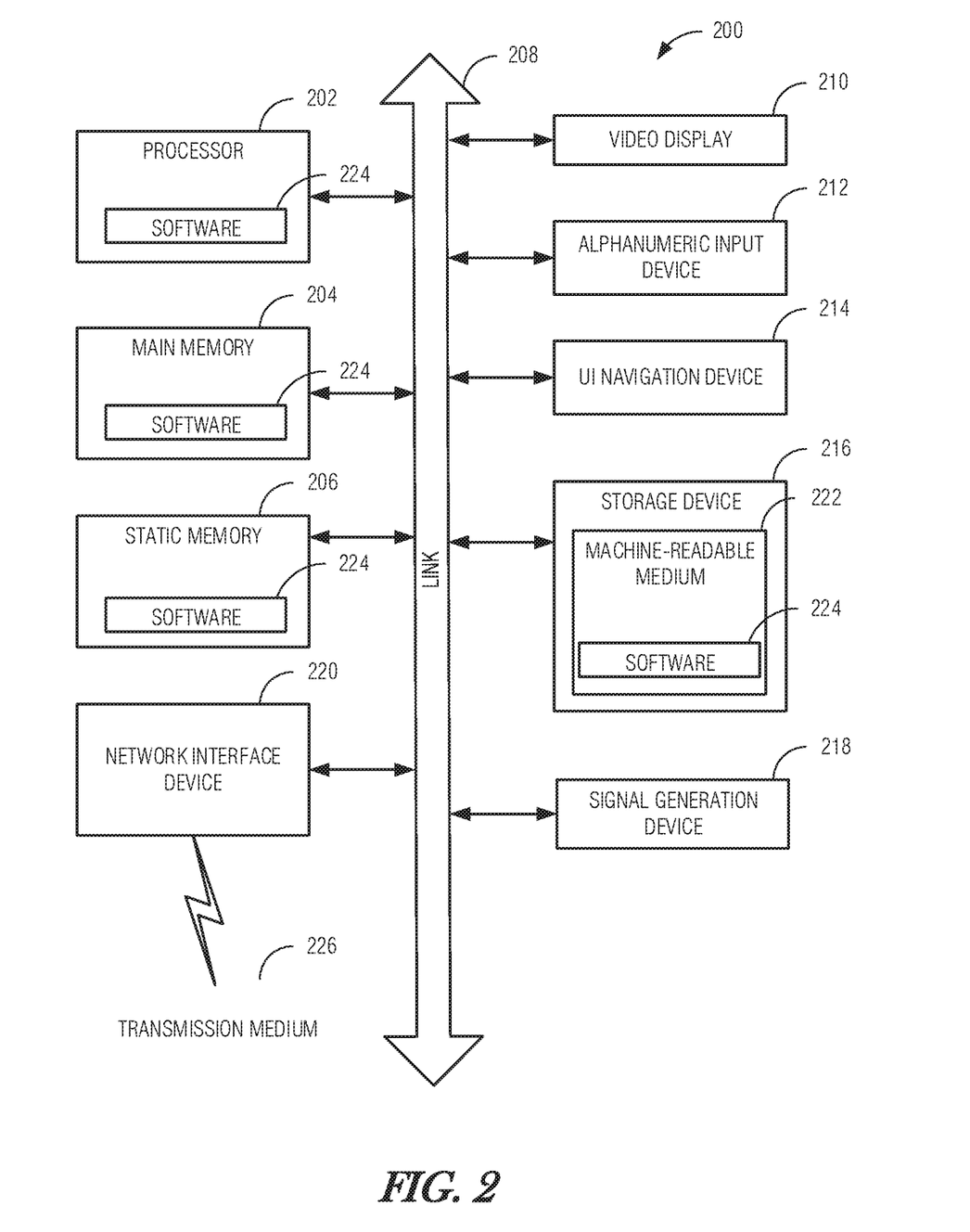
FIG. 2 is a block diagram illustrating a host machine platform, which may implement all, or portions of, the virtualization system of FIG. 1 according to some embodiments.

FIG. 2 is a block diagram illustrating a host machine platform, which may implement all, or portions of, the virtualization system of FIG. 1 according to some embodiments. In certain embodiments, programming of the computer system 200 according to one or more particular algorithms produces a special-purpose machine upon execution of that programming. In a networked deployment, the host machine may operate in the capacity of either a server or a client machine in server-client network environments, or it may act as a peer machine in peer-to-peer (or distributed) network environments. The host machine may take any suitable form factor, such as a personal computer (PC) workstation, a server, whether rack-mounted, or stand-alone, a mainframe computer, a cluster computing system, or the like, a set-top box, as well as a mobile or portable computing system, such as a laptop/notebook PC, an onboard vehicle system, wearable device, a tablet PC, a hybrid tablet, a personal digital assistant (PDA), a mobile telephone or, more generally, any machine capable of executing instructions (sequential or otherwise) that specify actions to be taken by that machine.

Example host machine 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The host machine 200 may further include a video display unit 210, an alphanumeric input device 212 (e.g., a keyboard), and a user interface (UI) navigation device 214 (e.g., a mouse). In one embodiment, the video display unit 210, input device 212 and UI navigation device 214 are incorporated into a touch screen display. The host machine 200 may additionally include a storage device 216 (e.g., a drive unit), a signal generation device 218 (e.g., a speaker), a network interface device (NID) 220, and one or more sensors (not shown), such as a global positioning system (GPS) sensor, compass, accelerometer, or other sensor.

The storage device 216 includes a machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the host machine 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 220 according to various embodiments may take any suitable form factor. In one such embodiment, NID 220 is in the form of a network interface card (NIC) that interfaces with processor 202 via link 208. In one example, link 208 includes a PCI Express (PCIe) interconnect, including a slot into which the NIC form-factor may removably engage. In another embodiment, NID 220 is a network interface circuit laid out on a motherboard together with local link circuitry, processor interface circuitry, other input/output circuitry, memory circuitry, storage device and peripheral controller circuitry, and the like. In another embodiment, NID 220 is a peripheral that interfaces with link 208 via a peripheral input/output port such as a universal serial bus (USB) port. NID 220 transmits and receives data over transmission medium 226, which may be wired or wireless (e.g., radio frequency, infra-red or visible light spectra, etc.), fiber optics, or the like.

Figure 3:
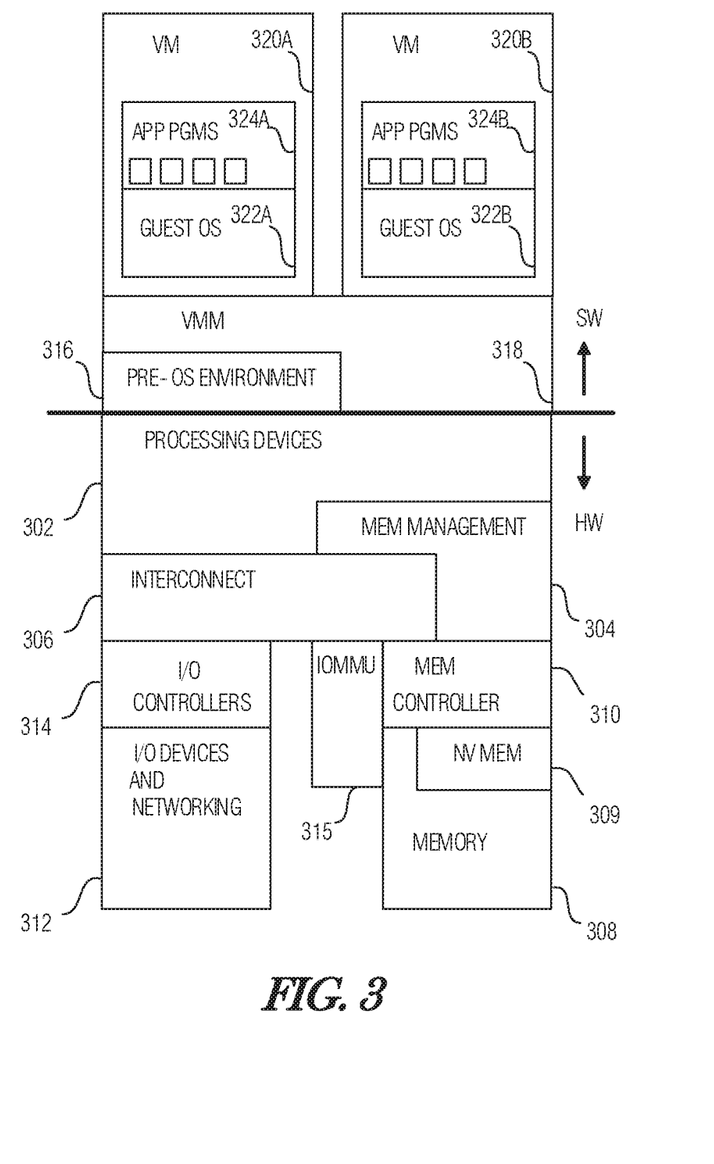
FIG. 3 is a diagram illustrating an example hardware and software architecture of a computer system such as the one depicted in FIG. 2, in which various interfaces between hardware components and software components are shown.

FIG. 3 is a diagram illustrating an example computing hardware and software architecture of a computer system such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., PCI-e, USB, etc. Memory 308 (e.g., dynamic random access memory—DRAM) and non-volatile memory 309 such as flash memory (e.g., electrically-erasable read-only memory—EEPROM, NAND Flash, NOR Flash, etc.) are interfaced with memory management device 304 and interconnect 306 via memory controller 310. I/O devices, including video and audio adapters, non-volatile storage, external peripheral links such as USB, personal-area networking (e.g., Bluetooth), etc., camera/microphone data capture devices, fingerprint readers and other biometric sensors, as well as network interface devices such as those communicating via Wi-Fi or LTE-family interfaces, are collectively represented as I/O devices and networking 312, which interface with interconnect 306 via corresponding I/O controllers 314.

In a related embodiment, input/output memory management unit IOMMU 315 supports secure direct memory access (DMA) by peripherals. IOMMU 315 may provide memory protection by meditating access to memory 308 from I/O device 312. IOMMU 315 may also provide DMA memory protection in virtualized environments, where it allows certain computing hardware resources to be assigned to certain guest VMs running on the system, and enforces isolation between other VMs and peripherals not assigned to them.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316 is responsible for initiating the launching of the operating system or virtual machine manager, but also provides an execution environment for embedded applications according to certain aspects of the invention.

Virtual machine monitor (VMM) 318 is system software that creates and controls the execution of virtual machines (VMs) 320A and 320B. VMM 318 may run directly on the hardware HW, as depicted, or VMM 318 may run under the control of an operating system as a hosted VMM.

Each VM 320A, 320B includes a guest operating system 322A, 322B, and application programs 324A, 324B.

Each guest operating system (OS) 322A, 322B provides a kernel that operates via the resources provided by VMM 318 to control the hardware devices, manage memory access for programs in memory, coordinate tasks and facilitate multi-tasking, organize data to be stored, assign memory space and other resources, load program binary code into memory, initiate execution of the corresponding application program which then interacts with the user and with hardware devices, and detect and respond to various defined interrupts. Also, each guest OS 322A, 322B provides device drivers, and a variety of common services such as those that facilitate interfacing with peripherals and networking, that provide abstraction for corresponding application programs 324A, 324B so that the applications do not need to be responsible for handling the details of such common operations. Each guest OS 322A, 322B additionally may provide a graphical user interface (GUI) that facilitates interaction with the user via peripheral devices such as a monitor, keyboard, mouse, microphone, video camera, touchscreen, and the like. In some embodiments, guest OS 322B may omit a GUI.

Each guest OS 322A, 322B may provide a runtime system that implements portions of an execution model, including such operations as putting parameters onto the stack before a function call, the behavior of disk input/output (I/O), and parallel execution-related behaviors.

In addition, each guest OS 322A. 322B may provide libraries that include collections of program functions that provide further abstraction for application programs. These include shared libraries, dynamic linked libraries (DLLs), for example.

Application programs 324A, 324B are those programs that perform useful tasks for users, beyond the tasks performed by lower-level system programs that coordinate the basis operability of the computer system itself.

According to some embodiments, the device drivers that are provided by each guest OS 322A, 322B are hardware platform-agnostic, meaning that they are configured to self-adapt their settings to comport with the functionality, i.e., the operational protocol, of any new I/O device without any a priori knowledge of the new I/O device and without any device driver specific to the new I/O device.

Accordingly, in some examples, these device drivers of the guest OS's running in the VMs include I/O-device-agnostic (IODA) drivers. IODA drivers may be VF drivers for use with a SR-IOV architecture according to some embodiments. Each IODA driver uses a communication path provided between each of the IODA driver and the hypervisor for configuring the IODA driver based on the hypervisor's knowledge of the underlying I/O device's operational protocol.

In one type of embodiment, the IODA driver is configured to query or instruct a device abstraction engine (DAE) that is provided as part of the hypervisor which, in turn, may send I/O device-related queries or instructions to the PF driver of the hypervisor to gather information about the I/O device or perform configuration of the I/O device. The I/O device-related queries or instructions may be communicated between the IODA driver and the DAE using a defined messaging protocol and message format, such as a description language known by the DAE and the IODA driver.

The description language may use any suitable format such as, for instance, using an extensible markup language (XML). The description language may or may not be of a format that is human-readable.

Figure 4:
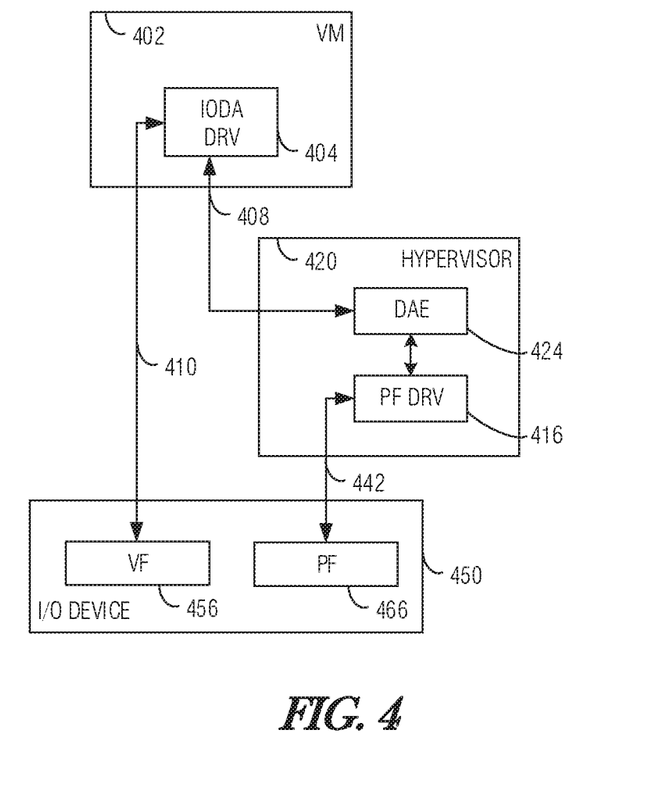
FIG. 4 is a block diagram illustrating a system architecture that supports an input/output device-agnostic (IODA) driver according to one type of embodiment.

FIG. 4 is a block diagram illustrating a system architecture that supports the IODA driver according to one type of embodiment. VM and guest OS 402 is executed over hypervisor 420, and includes IODA driver 404. In one example, VM and guest OS 402 are instantiated from a virtual appliance (e.g., a preconfigured virtual machine image, ready to run on a hypervisor) that is specifically hardened from being externally reconfigurable or otherwise modified.

Two independent communication paths are provided for IODA driver 404: configuration and control (CAC) path 408, and data path 410. CAC path 408 is used for communicating information to and from the hypervisor 420. In the embodiment depicted, CAC path is established and used by IODA driver 404 and DAE 424 to pass the I/O device-related queries or instructions from IODA driver 404 to DAE 424, and responses of the DAE 424 to those queries and instructions, including I/O device description information, to IODA driver 404. The CAC path may be implemented using known VM-hypervisor communication channels such as those provided by specialized application programming interfaces (APIs).

DAE 424 is configured to obtain the I/O device description information from I/O device 450. As depicted in the SR-IOV example shown, DAE 424 employs PF driver 416 to this end, which uses PF interface 442 between PF driver 416 of hypervisor 420 and PF 466 of I/O device 450. The I/O device description information generally includes information representing the operational capabilities of the I/O device, and sufficient operational details to make use of the I/O device at the device driver level. For example, in the case of the I/O device being a NID, the I/O device description may include (without limitation) a representation of the descriptor rings, whether the NID hardware supports flow control functionality, layer-2 (data link layer) encapsulation types, virtual local area network (VLAN) partitioning. NID configuration register definitions and settings, available data communication rates, and the like.

Upon obtaining the I/O device description information, IODA driver 404 sets operational parameters for controlling the I/O device according to preconfigured default criteria. The default criteria may be provided as part of IODA driver 404 as an operational policy definition. For instance, the default criteria may specify the use of hardware flow control if it is available. Once the operational parameters are set, the IODA driver operates the I/O device using data path 410 to interact with VF 456 to make use of SR-IOV.

In a related embodiment, IODA driver sets the operational parameters based on VM guest-OS settings or operator-driven settings, and further based on the available operational capabilities obtained from the I/O device description information. For instance, the operational parameters are set according to the intersection of the VM guest-OS settings or operator-driven settings on the one hand, with the available operational capabilities on the other hand.

Advantageously, if the VM 402 is to be used on a different hardware platform, or if any I/O devices of an existing hardware platform are changed, aspects of the embodiments facilitate use of the existing VM 402 with the new hardware platform.

Figure 5:
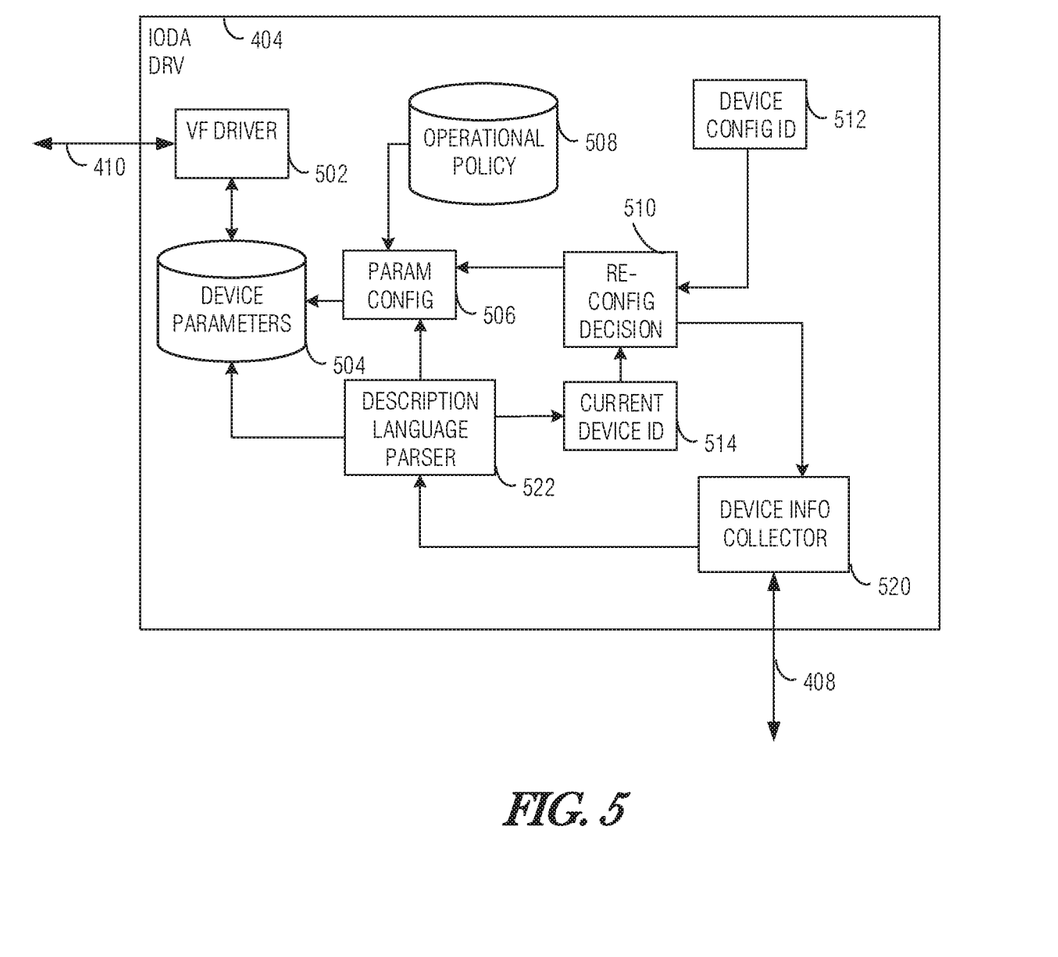
FIG. 5 is a block diagram illustrating various components of the IODA driver of FIG. 4 according to some embodiments.

FIG. 5 is a block diagram illustrating various components of IODA driver 404 according to some embodiments. IODA driver includes VF driver engine 502 that is configured to work with the VF of a SR-IOV-enabled I/O device. VF driver engine 502 configures the I/O device, and communicates data to and from the device. Configuration of the I/O device is based on device parameters 504, which are stored in, or under the control, of IODA driver 404. The device parameters are set by parameter configurator engine 506, which selects and sets the parameter values according to operational policy 508, which may be configured in IODA driver 404 by default. The parameter configurator 506 may need to update the device parameters under various circumstances, such as at the initial instantiation of the VM 402, or upon addition or changing of an I/O device.

Reconfiguration decision engine 510 determines whether the device parameters need to be updated. The determination may be based on one or more types of circumstances. For instance, upon instantiation of the VM, the I/O device configuration may be updated as a matter of course. In a related embodiment, upon configuration of the I/O device, a device configuration ID 512 (e.g., medium-access control (MAC) address, serial number, or other indicator) may be stored, and compared against a current device ID most recently obtained via the hypervisor and stored in register 514. In the case of a match, no update may be needed. In case of a mismatch, however, a device reconfiguration may be called for.

Information about the current I/O device is gathered by device information collector engine 520. Device information collector engine 520 sends requests, or commands, to the DAE of the hypervisor via CAC path 408, and receives response messages formatted according to a defined description language. Description language parser 522 interprets the response messages, and passes relevant items of information contained in the response message to parameter configurator engine 506, device parameters database 504, and current device ID data register 514.

Figure 6:
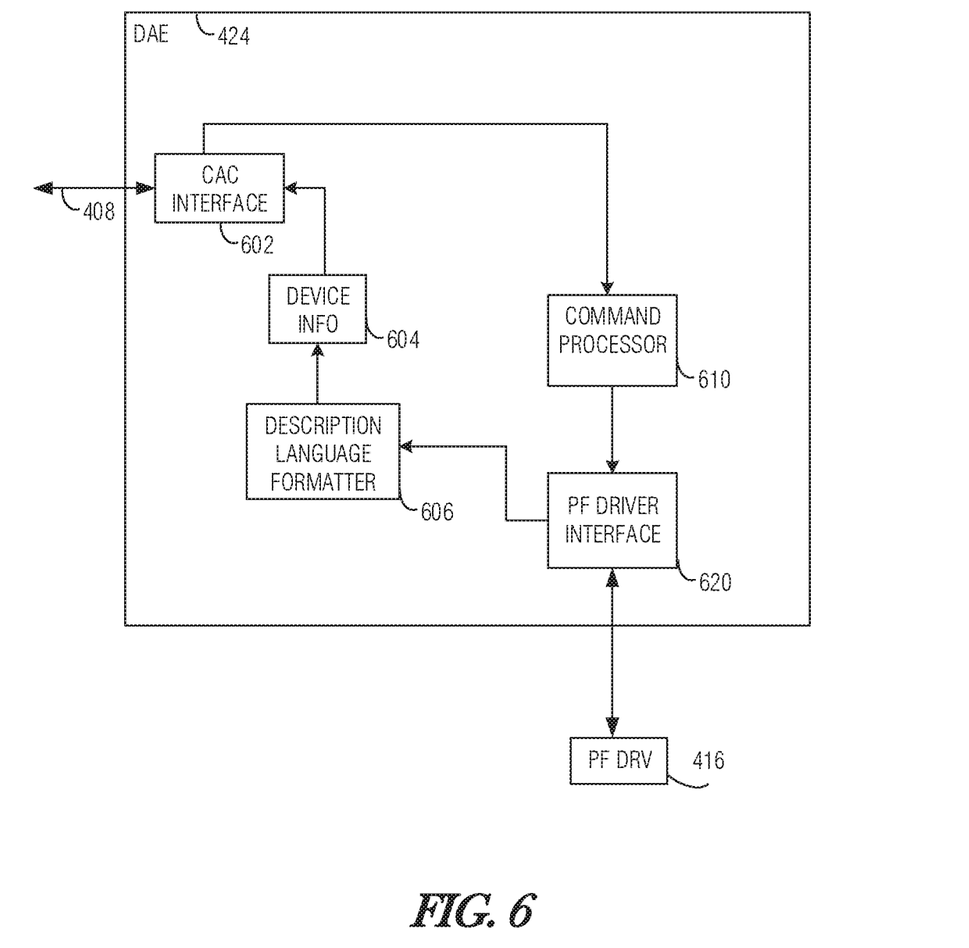
FIG. 6 is a block diagram illustrating some components of a device abstraction engine of the system of FIG. 4 according to an example embodiment.

FIG. 6 is a block diagram illustrating some components of DAE 424 according to an example embodiment. CAC interface 602 exchanges messages with IODA driver 404 via CAC path 408. These messages may include commands or requests from IODA driver 404 to obtain I/O device description information, and responses to those commands or requests providing the I/O device description information in a commonly-understood descriptor-language format. Command processor 610 interprets commands received by CAC interface 602, and formats the commands to be received and further acted upon by PF driver interface 620. PF driver interface 620 facilitates the passing of information to and from PF driver 416 of the hypervisor.

In some embodiments, the PF driver 416 may itself be the source of information about the I/O device. In other embodiments, PF driver 416 obtains the relevant information from the I/O device itself.

Device information provided to DAE 424 via PF driver interface 620 is initially in a format that differs from the description-language format shared by DAE 424 and IODA driver 404. Accordingly, description-language formatter engine 606 parses the received information and packages the information items in the shared description-language format. Device information 604 to be provided to IODA driver 404 via CAC interface 602 is thus in the commonly-understood description language.

Figure 7:
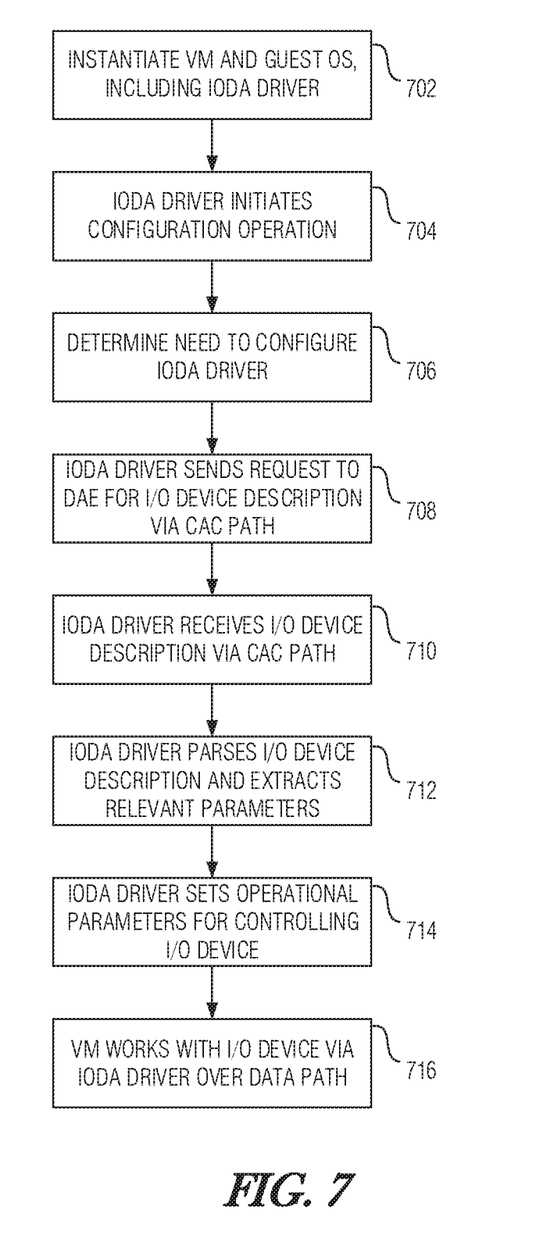
FIG. 7 is a flow diagram illustrating the operation of a virtual machine configured with an IODA driver according to some embodiments.

FIG. 7 is a flow diagram illustrating the operation of a virtual machine configured with an IODA driver according to some embodiments. At 702 the VM is instantiated, along with its guest OS and IODA driver. Prior to instantiation, the VM may have been in the form of a virtual appliance image. At 704, the IODA driver initiates its configuration operation. Accordingly, at 706 the need for configuring the IODA driver is assessed. In some implementations, configuration is called for upon instantiation. In related use cases, there may have occurred an event that results in an assessed need for reconfiguration of the IODA driver. For example, adding or changing of an I/O device may result in a call for configuration of the IODA driver.

In response to an assessed need to configure the IODA driver, at 708, the IODA driver sends a request to the DAE for a description of the relevant I/O device. This request is sent via the CAC path. In response to the request, the DAE operates to obtain the device information, such as by querying the PF driver of the hypervisor. At 710, the IODA driver receives the I/O device description via the CAC path from the DAE. The I/O device description is formatted in a description language that the IODA driver knows how to parse.

Accordingly, at 712 the IODA driver parses the I/O device description to extract relevant parameters to be set, and at 714 the setting of the parameters is performed to complete the configuration (or re-configuration) of the I/O device in the IODA driver. In a related embodiment, the parameters are set according to a defined policy that is preconfigured in the IODA driver.

At 716, the VM operates the I/O device using the configured IODA driver. Operation of the I/O device may be over a data path, such as a VF path in a SR-IOV device implementation, which provides isolation, security, and other advantages of an SR-IOV architecture. If the I/O device is updated or replaced by a different device necessitating different driver parameter settings, operations 706-714 may be repeated to re-configure the IODA driver to work with the new I/O device.

Additional Notes & Examples

Example 1 is apparatus for managing access to input/output devices by a virtual machine (VM), the apparatus comprising: computing hardware, including a processor coupled to a data store and an input/output (I/O) device interfaced with the processor, the computing hardware to: execute a hypervisor; instantiate the VM to execute under supervision of the hypervisor, the VM to include an I/O device-agnostic (IODA) driver that is configured to interface with the I/O device via a first path according to a set of operational parameters specific to the I/O device, and to interface with the hypervisor via a second path; execute the IODA driver to configure the operational parameters to comport with an operational protocol of the I/O device based on device-description information provided to the IODA driver via the second path.

In Example 2, the subject matter of Example 1 optionally includes wherein the first path is a data path, and wherein the second path is a configuration and control path.

In Example 3, the subject matter of any one or more of Examples 1-2 optionally include wherein the device-description information is formatted in a predefined description language.

In Example 4, the subject matter of Example 3 optionally includes wherein the predefined description language is independent of the operational protocol of the I/O device.

In Example 5, the subject matter of any one or more of Examples 3-4 optionally include wherein hypervisor is to execute a device-abstraction engine to translate I/O device-specific description information into the predefined description language.

In Example 6, the subject matter of Example 5 optionally includes wherein the device-abstraction engine is to communicatively interface with a device driver corresponding to the I/O device, the device driver executing with the hypervisor.

In Example 7, the subject matter of any one or more of Examples 1-6 optionally include wherein the IODA driver is to initiate a request via the second path to obtain the device-description information.

In Example 8, the subject matter of any one or more of Examples 1-7 optionally include wherein the IODA driver is to interface with the I/O device via a virtual function interface of the I/O device and wherein the hypervisor is to interface with the I/O device via a physical function interface of the I/O device.

In Example 9, the subject matter of any one or more of Examples 1-8 optionally include wherein the IODA driver is to interface with the I/O device via a single-root input/output virtualization (SR-IOV) system.

In Example 10, the subject matter of any one or more of Examples 1-9 optionally include wherein the VM is instantiated from a virtual appliance.

In Example 11, the subject matter of any one or more of Examples 1-10 optionally include wherein the I/O device is a network-interface device.

In Example 12, the subject matter of any one or more of Examples 1-11 optionally include wherein the IODA driver is to set the operational parameters according to a predefined operational policy.

Example 13 is a method for managing access to input/output devices by a virtual machine (VM), the method being executed by computing hardware, and comprising: executing a hypervisor; instantiating the VM to execute under supervision of the hypervisor, the VM to include an I/O device-agnostic (IODA) driver that is configured to interface with the I/O device via a first path according to a set of operational parameters specific to the I/O device, and to interface with the hypervisor via a second path: executing the IODA driver to configure the operational parameters to comport with an operational protocol of the I/O device based on device-description information provided to the IODA driver via the second path.

In Example 14, the subject matter of Example 13 optionally includes wherein the first path is a data path, and wherein the second path is a configuration and control path.

In Example 15, the subject matter of any one or more of Examples 13-14 optionally include wherein the device-description information is formatted in a predefined description language.

In Example 16, the subject matter of Example 15 optionally includes wherein the predefined description language is independent of the operational protocol of the I/O device.

In Example 17, the subject matter of any one or more of Examples 15-16 optionally include wherein hypervisor is to execute a device-abstraction process to translate I/O device-specific description information into the predefined description language.

In Example 18, the subject matter of Example 17 optionally includes wherein the device-abstraction process is to communicatively interface with a device driver corresponding to the I/O device, the device driver executing with the hypervisor.

In Example 19, the subject matter of any one or more of Examples 13-18 optionally include wherein the IODA driver is to initiate a request via the second path to obtain the device-description information.

In Example 20, the subject matter of any one or more of Examples 13-19 optionally include wherein the IODA driver is to interface with the I/O device via a virtual function interface of the I/O device and wherein the hypervisor is to interface with the I/O device via a physical function interface of the I/O device.

In Example 21, the subject matter of any one or more of Examples 13-20 optionally include wherein the IODA driver is to interface with the I/O device via a single-root input/output virtualization (SR-IOV) system.

In Example 22, the subject matter of any one or more of Examples 13-21 optionally include wherein the IODA driver is to set the operational parameters according to a predefined operational policy.

Example 23 is at least one machine-readable medium containing instructions for managing access to input/output devices by a virtual machine (VM), the instructions, when executed by computing hardware, cause the computing hardware to perform operations including: executing a hypervisor; instantiating the VM to execute under supervision of the hypervisor, the VM to include an I/O device-agnostic (IODA) driver that is configured to interface with the I/O device via a first path according to a set of operational parameters specific to the I/O device, and to interface with the hypervisor via a second path; executing the IODA driver to configure the operational parameters to comport with an operational protocol of the I/O device based on device-description information provided to the IODA driver via the second path.

In Example 24, the subject matter of Example 23 optionally includes wherein the first path is a data path, and wherein the second path is a configuration and control path.

In Example 25, the subject matter of any one or more of Examples 23-24 optionally include wherein the device-description information is formatted in a predefined description language.

In Example 26, the subject matter of Example 25 optionally includes wherein the predefined description language is independent of the operational protocol of the I/O device.

In Example 27, the subject matter of any one or more of Examples 25-26 optionally include wherein hypervisor is to execute a device-abstraction process to translate I/O device-specific description information into the predefined description language.

In Example 28, the subject matter of Example 27 optionally includes wherein the device-abstraction process is to communicatively interface with a device driver corresponding to the I/O device, the device driver executing with the hypervisor.

In Example 29, the subject matter of any one or more of Examples 23-28 optionally include wherein the IODA driver is to initiate a request via the second path to obtain the device-description information.

In Example 30, the subject matter of any one or more of Examples 23-29 optionally include wherein the IODA driver is to interface with the I/O device via a virtual function interface of the I/O device and wherein the hypervisor is to interface with the I/O device via a physical function interface of the I/O device.

In Example 31, the subject matter of any one or more of Examples 23-30 optionally include wherein the IODA driver is to interface with the I/O device via a single-root input/output virtualization (SR-IOV) system.

In Example 32, the subject matter of any one or more of Examples 23-31 optionally include wherein the IODA driver is to set the operational parameters according to a predefined operational policy.

Example 33 is a system for managing access to input/output devices by a virtual machine (VM), the system comprising: means for executing a hypervisor; means for instantiating the VM to execute under supervision of the hypervisor, the VM to include an I/O device-agnostic (IODA) driver that is configured to interface with the I/O device via a first path according to a set of operational parameters specific to the I/O device, and to interface with the hypervisor via a second path; means for executing the IODA driver to configure the operational parameters to comport with an operational protocol of the I/O device based on device-description information provided to the IODA driver via the second path.

In Example 34, the subject matter of Example 33 optionally includes wherein the first path is a data path, and wherein the second path is a configuration and control path.

In Example 35, the subject matter of any one or more of Examples 33-34 optionally include wherein the device-description information is formatted in a predefined description language.

In Example 36, the subject matter of Example 35 optionally includes wherein the predefined description language is independent of the operational protocol of the I/O device.

In Example 37, the subject matter of any one or more of Examples 35-36 optionally include wherein hypervisor is to execute a device-abstraction process to translate I/O device-specific description information into the predefined description language.

In Example 38, the subject matter of Example 37 optionally includes wherein the device-abstraction process is to communicatively interface with a device driver corresponding to the I/O device, the device driver executing with the hypervisor.

In Example 39, the subject matter of any one or more of Examples 33-38 optionally include wherein the IODA driver is to initiate a request via the second path to obtain the device-description information.

In Example 40, the subject matter of any one or more of Examples 33-39 optionally include wherein the IODA driver is to interface with the I/O device via a virtual function interface of the I/O device and wherein the hypervisor is to interface with the I/O device via a physical function interface of the I/O device.

In Example 41, the subject matter of any one or more of Examples 33-40 optionally include wherein the IODA driver is to interface with the I/O device via a single-root input/output virtualization (SR-IOV) system.

In Example 42, the subject matter of any one or more of Examples 33-41 optionally include wherein the VM is instantiated from a virtual appliance.

In Example 43, the subject matter of any one or more of Examples 33-42 optionally include wherein the I/O device is a network-interface device.

In Example 44, the subject matter of any one or more of Examples 33-43 optionally include wherein the IODA driver is to set the operational parameters according to a predefined operational policy.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. Apparatus to manage access to input/output devices by a virtual machine (VM), the apparatus comprising:
computing hardware, including a processor coupled to a data store and an input/output (I/O) device interfaced with the processor, the computing hardware to:
execute a hypervisor;
instantiate the VM to execute under supervision of the hypervisor, the VM to include an I/O device-agnostic (IODA) driver that is configured to interface with the I/O device via a first path according to a set of operational parameters specific to the I/O device, and to interface with the hypervisor via a second path;
execute the IODA driver to configure the operational parameters to comport with an operational protocol of the I/O device based on device-description information provided to the IODA driver via the second path.

2. The apparatus of claim 1, wherein the first path is a data path, and wherein the second path is a configuration and control path.

3. The apparatus of claim 1, wherein the device-description information is formatted in a predefined description language.

4. The apparatus of claim 3, wherein the predefined description language is independent of the operational protocol of the I/O device.

5. The apparatus of claim 3, wherein hypervisor is to execute a device-abstraction engine to translate I/O device-specific description information into the predefined description language.

6. The apparatus of claim 5, wherein the device-abstraction engine is to communicatively interface with a device driver corresponding to the I/O device, the device driver executing with the hypervisor.

7. The apparatus of claim 1, wherein the IODA driver is to initiate a request via the second path to obtain the device-description information.

8. The apparatus of claim 1, wherein the IODA driver is to interface with the I/O device via a virtual function interface of the I/O device and wherein the hypervisor is to interface with the I/O device via a physical function interface of the I/O device.

9. The apparatus of claim 1, wherein the IODA driver is to interface with the I/O device via a single-root input/output virtualization (SR-IOV) system.

10. The apparatus of claim 1, wherein the VM is instantiated from a virtual appliance.

11. The apparatus of claim 1, wherein the I/O device is a network-interface device.

12. The apparatus of claim 1, wherein the IODA driver is to set the operational parameters according to a predefined operational policy.

13. A method for managing access to input/output devices by a virtual machine (VM), the method being executed by computing hardware, and comprising:
executing a hypervisor;
instantiating the VM to execute under supervision of the hypervisor, the VM to include an I/O device-agnostic (IODA) driver that is configured to interface with an I/O device via a first path according to a set of operational parameters specific to the I/O device, and to interface with the hypervisor via a second path;
executing the IODA driver to configure the operational parameters to comport with an operational protocol of the I/O device based on device-description information provided to the IODA driver via the second path.

14. The method of claim 13, wherein the device-description information is formatted in a predefined description language.

15. The method of claim 13, wherein the IODA driver is to initiate a request via the second path to obtain the device-description information.

16. At least one non-transitory machine-readable medium containing instructions for managing access to input/output devices by a virtual machine (VM), the instructions, when executed by computing hardware, cause the computing hardware to perform operations including:
executing a hypervisor;
instantiating the VM to execute under supervision of the hypervisor, the VM to include an I/O device-agnostic (IODA) driver that is configured to interface with the I/O device via a first path according to a set of operational parameters specific to the I/O device, and to interface with the hypervisor via a second path;
executing the IODA driver to configure the operational parameters to comport with an operational protocol of the I/O device based on device-description information provided to the IODA driver via the second path.

17. The at least one non-transitory machine-readable medium of claim 16, wherein the first path is a data path, and wherein the second path is a configuration and control path.

18. The at least one non-transitory machine-readable medium of claim 16, wherein the device-description information is formatted in a predefined description language.

19. The at least one non-transitory machine-readable medium of claim 18, wherein the predefined description language is independent of the operational protocol of the I/O device.

20. The at least one non-transitory machine-readable medium of claim 18, wherein hypervisor is to execute a device-abstraction process to translate I/O device-specific description information into the predefined description language.

21. The at least one non-transitory machine-readable medium of claim 20, wherein the device-abstraction process is to communicatively interface with a device driver corresponding to the I/O device, the device driver executing with the hypervisor.

22. The at least one non-transitory machine-readable medium of claim 16, wherein the IODA driver is to initiate a request via the second path to obtain the device-description information.

23. The at least one non-transitory machine-readable medium of claim 16, wherein the IODA driver is to interface with the I/O device via a virtual function interface of the I/O device and wherein the hypervisor is to interface with the I/O device via a physical function interface of the I/O device.

24. The at least one non-transitory machine-readable medium of claim 16, wherein the IODA driver is to interface with the I/O device via a single-root input/output virtualization (SR-IOV) system.

25. The at least one non-transitory machine-readable medium of claim 16, wherein the IODA driver is to set the operational parameters according to a predefined operational policy.

\* \* \* \* \*